United States Patent [19]

Narita et al.

[11] 4,209,733
[45] Jun. 24, 1980

[54] MOTOR CONTROL APPARATUS WITH AN IMPROVED THYRISTOR CHOPPER CIRCUIT

[75] Inventors: Hiroshi Narita; Masahiko Ibamoto; Jinichi Toyama, all of Ibaraki, Japan

[73] Assignee: Hitachi, Ltd., Japan

[21] Appl. No.: 936,927

[22] Filed: Aug. 25, 1978

[30] Foreign Application Priority Data

Aug. 26, 1977 [JP] Japan .................................. 52-101643

[51] Int. Cl.² .......................................... H02P 29/02
[52] U.S. Cl. ................................. 318/345 C; 318/317; 318/318; 318/432
[58] Field of Search ............... 318/317, 318, 332, 341, 318/345 R, 345 D, 345 C, 345 G, 346, 375, 378, 379, 380, 432

[56] References Cited

U.S. PATENT DOCUMENTS

| | | | |
|---|---|---|---|
| 3,593,089 | 7/1971 | Appelo | 318/370 |
| 3,660,738 | 5/1972 | Anderson et al. | 318/345 C |
| 3,678,360 | 7/1972 | Minarik et al. | 318/345 D |
| 3,757,180 | 9/1973 | Subler | 318/345 C |
| 3,777,237 | 12/1973 | Anderson | 318/345 C |
| 3,854,076 | 12/1974 | Lambert | 318/345 C |
| 3,875,486 | 4/1975 | Barton | 318/341 |
| 4,052,625 | 10/1977 | Cameron | 318/345 G |
| 4,057,752 | 11/1977 | Artrip et al. | 318/341 |
| 4,124,812 | 11/1978 | Naito et al. | 318/376 |

OTHER PUBLICATIONS

R. E. Morgan, "Time Ratio Control with Combined SCR and SR Commutation", IEEE Trans. on Communications and Electronics, vol. 83, pp. 366–371, 7–1964.
W. McMurray, "Silicon–Controlled Rectifier D–C to D-C Power Converters," IEEE Trans. on Communications and Electronics, vol. 83, pp. 198–203, 3–1964.

*Primary Examiner*—B. Dobeck
*Attorney, Agent, or Firm*—Craig and Antonelli

[57] ABSTRACT

A motor control apparatus to supply current from a D-C source to an electric motor has a thyristor chopper circuit, the duty factor of which is controlled depending on a current instruction signal. The thyristor chopper circuit is provided between the terminals of the D-C source in series with an electric motor, and has main and auxiliary thyristors. A series connection of a capacitor and a reactor, forming commutating elements, is connected across the auxiliary thyristor and oscillates to generate a pulse of current through a forward diode in order to turn off the main thyristor when the auxiliary thyristor is turned on. In addition, a saturable current transformer is so provided that through a primary winding thereof chopper current flows, and the secondary winding operates as the reactance of the commutating elements. Current flowing through the secondary winding therefore depends on the chopper current flowing through the primary winding.

9 Claims, 7 Drawing Figures

MOTOR CONTROL APPARATUS WITH AN IMPROVED THYRISTOR CHOPPER CIRCUIT

BACKGROUND OF THE INVENTION

The present invention relates to a motor control apparatus, more particularly, to an improved motor control apparatus having a thyristor chopper.

In recent years, circuits to control electric power supplied to electric motors have been proposed, in which the voltage is applied to the motor intermittently at a predetermined period through a chopper circuit using thyristors or power transistor so that the average value thereof is maintained at a desired value. In such a control circuit, it is desired, in addition to reduction of size, that a duty factor of the chopper circuit, i.e., the ratio of conductive time to the sum of conductive and non-conductive times be controlled over a wide range.

In the article by R. E. Morgan "Time Ratio Control with Combined SCR and SR Commutation", *IEEE Trans. on Communications and Electronics,* Vol. 83, pages 366-371, July, 1964, there is shown a commutating circuit for TRC that combines an auxiliary SCR and a SR. This commutating circuit contributes to the reduction of the cost and size of the auxiliary SCR. However, it has drawbacks in that two kinds of reactors $L_C$ and $SR_C$ are necessary, the former having a relatively high inductance and the latter being a saturable reactor, and in that commutating current through the auxiliary SCR is always determined by commutating elements of a capacitor $C_C$ and the reactor $L_C$.

Other relevant prior art is as follows:

(1) W. McMuarry, "Silicon-Controlled Rectifier D-C to D-C Power Converters", *IEEE Trans. on Communication and Electronics,* Vol. 83, pp. 198-203, March, 1964.

This shows various ways in which saturable transformers are used in silicon-controlled rectifiers.

(2) U.S. Pat. No. 3,875,486, "Motor Speed Control Circuit".

This shows Jone's chopper circuit having a transformer. This Jone's chopper, however, differs from an ordinary chopper circuit in construction and operation.

(3) U.S. Pat. No. 3,903,465, "Chopper Control System".

In this chopper control system, the application of the chopper-off signal to the chopper is prohibited by a prohibit circuit.

SUMMARY OF THE INVENTION

Accordingly, an object of the present invention is to provide a motor control apparatus having an improved chopper circuit, in which the relative reduction in size of the auxiliary thyristor and the commutating elements are accomplished.

Another object of the present invention is to provide a motor control apparatus in which the speed of the electric motor can be controlled over a wide range.

According to the present invention, the objects mentioned above are achieved by a motor control apparatus having a chopper circuit in which main and auxiliary thyristors and commutating elements including a series connection of a capacitor and a reactor are connected in parallel to one another, and characterized in that there is further provided a saturable current transformer, and that through the primary winding thereof motor current or chopper current flows while the secondary winding operates as the reactor of the commutating elements.

Another object mentioned above is achieved by a motor control apparatus further having chopper control means in which the application of the chopper-off signal is prohibited.

The objects mentioned above and other objects and advantages of the present invention will become more apparent from the following detailed description of the preferred embodiments given by reference to the accompanying drawings.

DETAILED DESCRIPTION OF PREFERRED EMBODIMENTS

Figure 1:
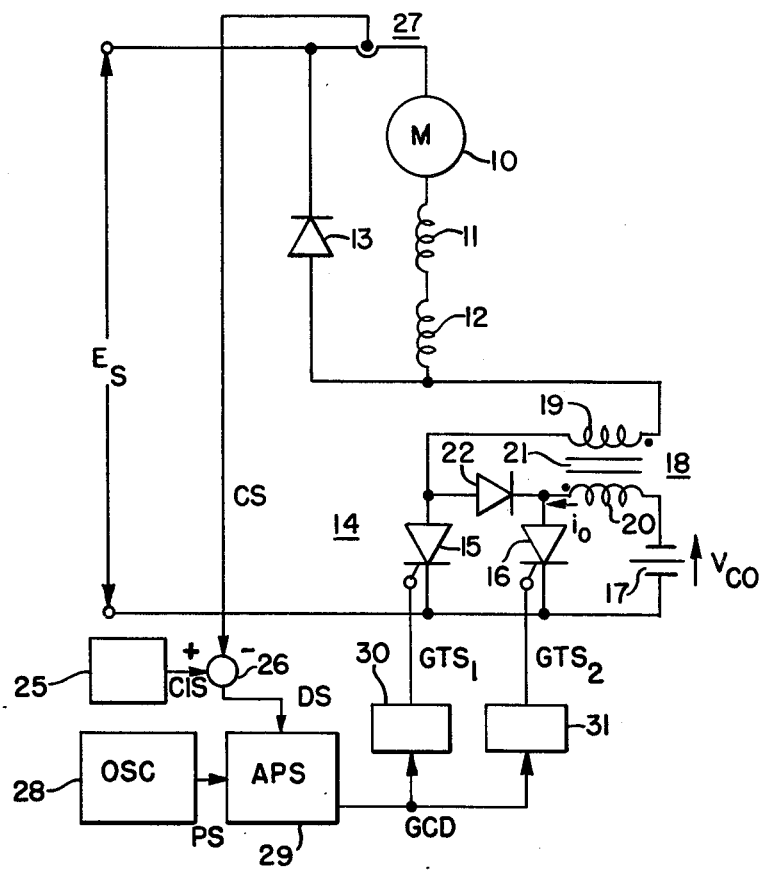
FIG. 1 is a schematic diagram of an embodiment of a motor control apparatus according to the present invention.

Referring now to the drawings, where like elements are indicated by like reference numerals, and particularly to FIG. 1, a D-C electric motor 10 has a field winding 11 connected in series therewith. A smoothing reactor 12 is further connected in series to the field winding 11. Across the series connection of the motor 10, the field winding 11 and the reactor 12, a freewheel diode 13 is connected. The motor 10 is supplied with current from a D-C voltage source $E_S$ through a chopper circuit 14, and when the chopper circuit 14 is blocked, current can continue to flow through the freewheel diode 13.

The chopper circuit 14 has a main thyristor 15 and an auxiliary thyristor 16, commutating elements including a capacitor 17 and a saturable current transformer 18. The saturable current transformer 18 has a primary winding 19 and a secondary winding 20, and a saturable iron-core 21 magnetically coupled therebetween. In the figure the polarity of the primary and secondary windings 19 and 20 are indicated by conventional designation. The anode of the main thyristor 15 is connected through the primary winding 19 to the lower end of the smoothing reactor 12, and the cathode thereof is connected to the negative terminal of the D-C voltage source $E_S$. The cathode of the auxiliary thyristor 16 is connected to that of the main thyristor 15. The anode of the auxiliary thyristor 16 is connected through a forward diode 22 to that of the main thyristor 15. The commutating elements, including a series connection of the secondary winding 20 of the saturable current transformer 18 and the capacitor 17, is provided in parallel to the auxiliary thyristor 16. The secondary winding 19 operates as saturable reactor in the commutating elements mentioned above.

The main and the auxiliary thyristors 15 and 16 of the chopper circuit 14 are controlled in the ON-OFF operations by gate triggering signals GTS₁ and GTS₂ from a chopper control circuit. The detailed description of the chopper control circuit will be given afterward.

Figure 2:
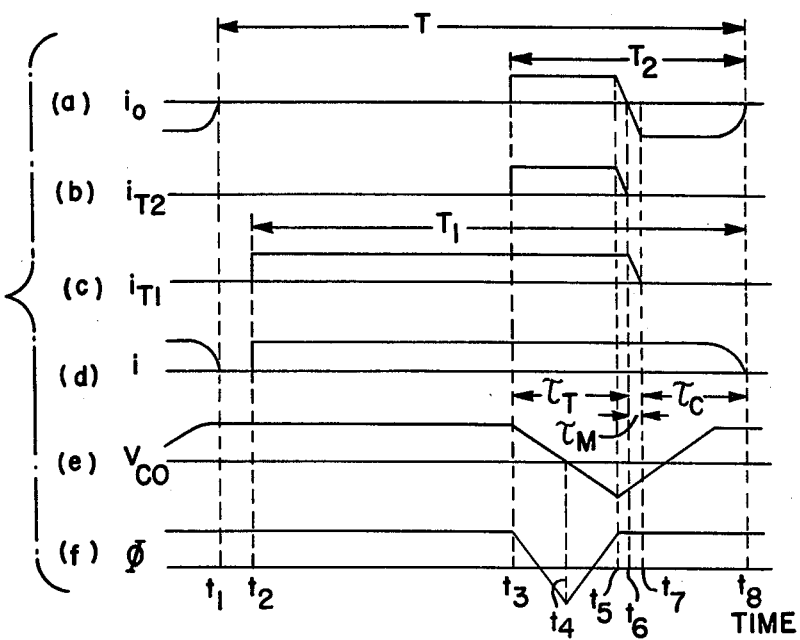
FIGS. 2(*a*) through 2(*f*) show waveforms of current, voltage, and magnetic flux at various portions of the chopper circuit of the motor control apparatus shown in FIG. 1 for a better understanding of the invention.

The operation of the above-mentioned chopper circuit 14 is given with reference to FIG. 2(a) through 2(f) hereinafter. Before the main thyristor 15 is turned on at time $t_1$, the capacitor 17 is previously charged up to or above the voltage $V_{CO}$ equal to the D-C voltage source $E_S$ ($V_{CO} \geq E_S$). The waveform of the voltage $V_{CO}$ is shown in FIG. 2(e). Although the voltage $V_{CO}$ appearing across the charged capacitor 17 is theoretically expressed as $V_{CO} = E_S$, the voltage $V_{CO}$ in an actual circuit becomes greater than $E_S$. This will be explained in detail later.

When the main thyristor 15 is turned on at time $t_2$, current $i_{T1}$, which is equal in amplitude to chopper circuit $i_{CH}$, begins to flow through the main thyristor 15 as shown in FIG. 2(c). After the main thyristor 15 is turned on, however, the forward diode 22 blocks discharge current from the capacitor 17, and the voltage across the capacitor 17 remains $V_{CO}$ ($\geq E_S$) until the auxiliary thyristor 16 is turned on. At time $t_3$ when the auxiliary thyristor 16 is turned on, the charged capacitor 17 begins to discharge through it, and discharge current flows. Because the chopper current $i_{CH}$ which is shown in FIG. 2(d) flows through the primary winding 19, a pulse of the discharge current $i_O$ shown in FIG. 2(a) flows through the secondary winding 20 of the saturable current transformer 18. The amplitude of the discharge current $i_O$ can be described by the following equation:

$$i_O = (N_1/N_2) \cdot i_{CH} \quad (1)$$

wherein $N_1$ and $N_2$ are the number of turns of the primary and the secondary windings 19 and 20 of the saturable current transformer 18, respectively.

Figure 3:
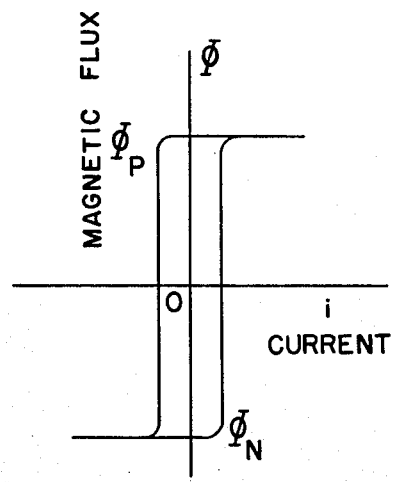
FIG. 3 shows current-magnetic flux characteristic curve of a saturable core used in a saturable current transformer shown in FIG. 1.

In FIG. 3 there is shown the current-magnetic flux ($I-\phi$) characteristic curve of the saturable iron-core 21 of the saturable current transformer 18, which is well known in the art. Thus, when the auxiliary thyristor 16 is turned on at the time $t_3$, the voltage $V_{CO}$ across the capacitor 17 is applied across the secondary winding 20. The pulse of the current $i_O$ described by the equation (1) flows through the secondary winding 20 as the discharge current from the capacitor 17, and the voltage $V_{CO}$ across the capacitor 17 decreases. At the same time, the magnetic flux $\Phi$ of the saturable iron-core 21 is drawn from the positive saturated value $\Phi_P$ toward the negative one $\Phi_N$ as the discharge current flows through the secondary winding 20. At time $t_4$, the voltage $V_{CO}$ becomes zero and the magnetic flux $\Phi$ reaches almost the negative saturated value $\Phi_N$. However, as is shown in FIG. 2(a), the current $i_O$ continues to flow through the secondary winding 20 into the capacitor 17 as charge current after the capacitor 17 has fully discharged. The current $i_O$ continues to flow until the magnetic flux $\Phi$ turns to the positive saturated value $\Phi_P$ again, because the saturable iron-core 21 of the saturable current transformer 18 is not saturated during that period. Therefore, the capacitor 17 becomes charged into the opposite polarity by the charge current $i_O$. The magnetic flux $\Phi$ is drawn back and at time $t_5$ when the magnetic flux $\Phi$ reaches the positive saturated value $\phi_P$ again, the inductance of the secondary winding 20 becomes very small rapidly. Then, the commutating elements, including the series connection of the secondary winding 20 and the capacitor 17, which is a well known L-C resonant circuit, starts to oscillate at the resonant frequency. At the same time, the forward diode 22 becomes conductive and the reverse voltage $V_{CO}$ across the capacitor 17 is applied across the main and the auxiliary thyristors 15 and 16. As is shown in FIGS. 2(b) and 2(c), current $i_{T2}$ through the auxiliary thyristor 16 decreases down to zero at time $t_6$ when the current $i_O$, which is oscillated by the L-C resonant circuit, becomes zero. The current $i_{T1}$ through the main thyristor 15 also decreases down to zero at time $t_7$ when the current $i_O$ becomes to be equal to the chopper current of the reverse polarity ($-i_{CH}$). These thyristors 15 and 16, consequently, turn off one after another. However, the chopper current $i_{CH}$, as shown in FIG. 2(d), continues to flow through the forward diode 22 and the secondary winding 20 into the capacitor 17 until it is charged up to the voltage $V_{CO}$ ($\geq E_S$) again. The chopper circuit 14, thus, turns off at time $t_8$.

In the above-mentioned embodiment, the primary winding 19 of the saturable current transformer 18 is provided through which the chopper current $i_{CH}$ flows. The location of the primary winding 19, however, is not so limited as mentioned above. For example, the primary winding 19 can be so located in the circuit that motor current $i_M$ which is equal to the chopper current $i_{CH}$ in the amplitude during the time the chopper circuit 14 is conductive flows through the primary winding 19. This will be explained in more detail later.

In FIGS. 2(a) to 2(f) T represents the repetition time period of the chopper circuit 14, and $T_1$ the conductive period thereof. The duty factor $\Gamma$ of the chopper circuit 14, therefore, can be described by the following equation:

$$\Gamma = T_1/T \quad (2)$$

The conductive period $T_1$ includes a commutating period $T_2$ including a period $\Gamma_P$ during which the current $i_O$ flows through the auxiliary thyristor 15, a period $\Gamma_T$ during which the main thyristor 15 is turned off and a period $\Gamma_C$ during which the capacitor 17 is charged up to $V_{CO}$ again.

As is apparent from FIG. 2(f), the period $\Gamma_T$ is twice as long as the period ($t_3 - t_4$) during which the magnetic flux $\Phi$ of the saturable iron-core 21 of the saturable current transformer 18 is drawn from the positive saturated value $\Phi_P$ down to the negative one $\Phi_N$. Therefore, the product of voltage and time (V·S) of the saturable current transformer 18 is as follows:

$$V \cdot S = V_{CO} \cdot \Gamma_T / 2 \cdot \tfrac{1}{2} = (V_{CO} \cdot \Gamma_T)/4 \quad (3)$$

While assuming that the cross section of the saturable iron-core 21 is A (m²) and that the magnetic flux density thereof is B (Wb/m²), the product of the voltage and time (V·S) of the saturable current transformer 18 can be also described as follows:

$$V \cdot S = 2 N_2 \cdot B \cdot A \quad (4)$$

wherein $N_2$ is the number of turns of the secondary winding 20. The material and the size of the saturable iron-core 21 of the saturable transformer 18 can be determined by the above two equations (3) and (4).

In the embodiment shown in FIG. 1, if the capacitor 17 is charged to the voltage $V_{CO}$ almost equal to $E_S$, the period $\Gamma_T$ fluctuates depending on the magnitude of the chopper current $i_{CH}$, on which the current $i_O$ discharging from the capacitor 17 is determined. However, it is well known in the art that the capacitor 17 in the actual circuit is charged up to the voltage $V_{CO}$ greater than the source voltage $E_S$ because of the inductance through which the charge current flows into the capacitor 17, i.e., the secondary winding 20, wiring of the circuit, and so forth. Assuming that the above-mentioned inductance is L', the over-charge voltage $V_{CO}$ across the capacitor 17 becomes as follows:

$$V_{CO} = E_S + i_{CH} \cdot \sqrt{L' \cdot C_O} \qquad (5)$$

wherein $i_{CH}$ is the amplitude of the chopper current and $C_O$ is the capacity of the capacitor 17.

From the equation (5), it is apparent that, if the second term ($i_{CH}\sqrt{L'/C_O}$) is set much greater than the first term ($E_S$), the overcharge voltage $V_{CO}$ becomes to be almost relative to the chopper current $i_{CH}$. The greater the amplitude of the chopper current $i_{CH}$, the higher the overcharge voltage $V_{CO}$. Therefore, the fluctuation of the period $\Gamma_T$ mentioned above can be avoided by setting $i_{CH}\sqrt{L'/C_O}$ to be much greater than the source voltage $E_S$. This can be achieved by reducing the capacity $C_O$ of the capacitor 17. However, it should be noted that there is a limit in the reduction of the capacity $C_O$, i.e., the capacitor 17 must have enough capacity $C_O$ to perform the turn-off of the thyristors 15 and 16 completely.

Further, the primary winding 19 of the saturable current transformer 18 serves as the above-mentioned inductance L' for overcharging the capacitor 17 in the embodiment of FIG. 1. Therefore, the overcharge voltage $V_{CO}$ across the capacitor 17 can be also set at a desired value by selecting an appropriate number of turns for the primary winding 19 of the saturable current transformer 18.

As an example, the detail of the chopper circuit, which is applied to a motor control for use in a forklift, is described hereinafter. The motor control has a D-C source voltage $E_S = 36$ (V) and controls motor current over the range from 50 (A) to 600 (A). In the chopper circuit, a thyristor of maximum forward current capacity of 100 (A) is used as the auxiliary thyristor 16 and a capacitor of 200 (μF) is provided as the capacitor. The details of the saturable current transformer 18 is as follows:

the material of the iron-core 21: silicon steel
the cross section A of the iron-core 21: $6 \times 10^{-6}$ (m$^2$)
turn number $N_1$ of the first winding 19: 3
turn number $N_2$ of the second winding 20: 5

And the inductance L' of the chopper circuit is so designed that the capacitor 17 can be overcharged to the voltage $V_{CO} = 170$ (V).

The above-mentioned chopper circuit has the following experimentally-found advantages. The period $\Gamma_M$, during which the current $i_{T1}$ through the main thyristor 15 is distinguished, is relatively shortened compared to the conventional circuit, because the current $i_O$ oscillated by the L-C resonant circuit rises rapidly in the reverse polarity as shown in FIG. 2(a). This is caused by the fact that the magnetic flux Φ of the saturable current transformer 18 is drawn back to the positive saturated value $\Phi_P$ and the inductance of the secondary winding 20 thereof becomes very small at time $t_5$. Further, because the voltage $(N_1/N_2) \cdot V_{CO}$ is induced across the primary winding 19 of the saturable current transformer 18 and the overcharged voltage $V_{CO}$ becomes greater than the source voltage $E_S$, the current $i_{T1}$ through the thyristor 15 is reduced and the commutation can be performed easily. These advantages apparently contribute to the reduction of the current capacity of the auxiliary thyristor 16 and the capacity $C_O$ of the capacitor 17.

Returning to FIG. 1, the chopper control circuit includes a current instruction signal generator 25 generating a current instruction signal CIS. The current instruction signal generator 25 is constructed with, for example, a potentiometer generating a signal, the voltage value of which varies depending on the position of the intermediate tap thereof. The current instruction signal CIS is applied to a positive input of a comparator 26. While, current supplied to the electric motor 10 is detected by a current transformer 27. A current signal CS from the current transformer 27 has a voltage value relative to the current supplied at that instant, and applied to a negative input of the comparator 26. Comparing the current instruction signal CIS and the current signal CS, the comparator 26 produces a difference signal DS.

An oscillator 28 generates a pulse signal PS at a predetermined period. An automatic phase shifter 29 receives the pulse signal PS and the difference signal DS from the comparator 26, and produces a gate control pulse GCT at the output thereof. A first differentiating circuit 30 receiving the gate control pulse GCT generates a gate triggering signal $GTS_1$ to the gate of the main thyristor 15. A second differentiating circuit 31 which also receives the gate control pulse GCT generates the gate triggering signal $GTS_2$ to the gate of the auxiliary thyristor 16.

Figure 4:
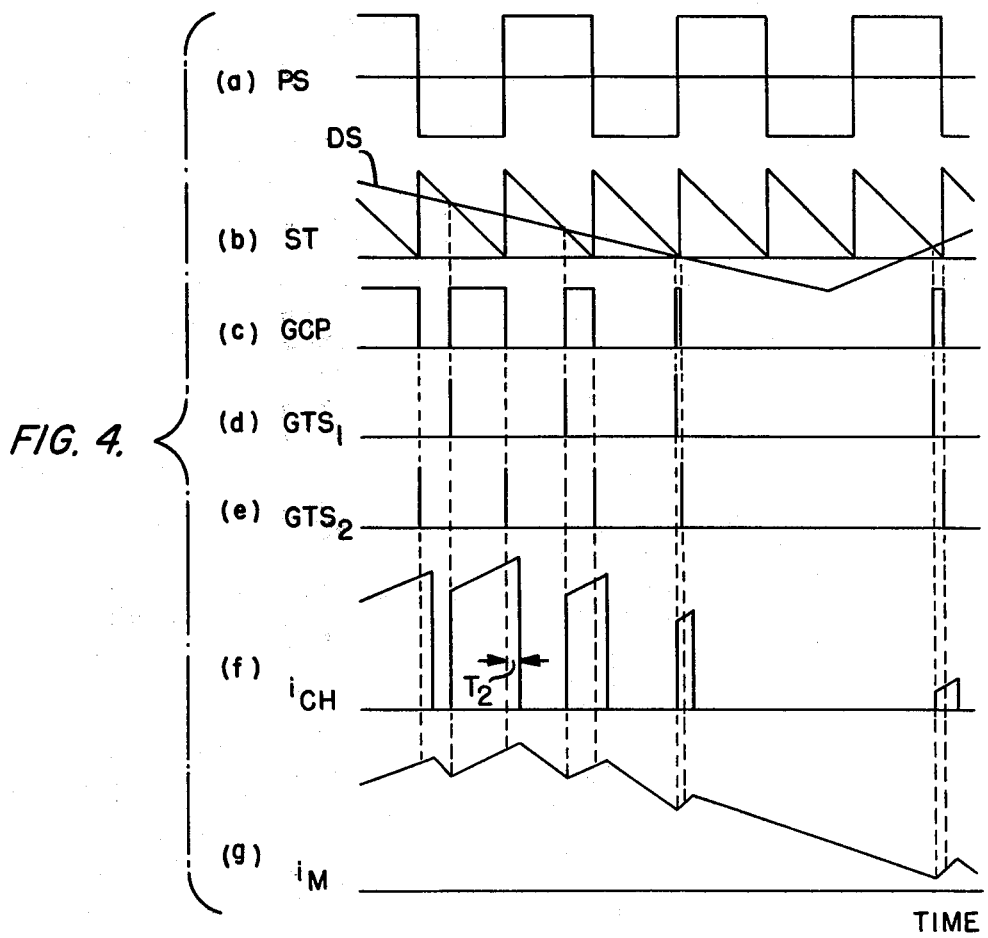
FIGS. 4(*a*) to 4(*g*) also show various waveforms at various portions of the entire motor control apparatus shown in FIG. 1 for explanation of the operation thereof.

In FIG. 4(a) there is shown a waveform of the pulse signal PS generated from the oscillator 28. The automatic phase shifter 29 generates a saw tooth wave ST as shown in FIG. 4(b) on the basis of the pulse signal PS. Comparing the difference signal DS from the comparator 26 to the saw tooth wave ST, the automatic phase shifter 29 generates the gate control pulse GCD shown in FIG. 4(c) in the case where the difference signal DS is greater than the saw tooth wave ST. For better understanding, the difference signal DS is also shown in FIG. 4(b). The first differentiating circuit 30 generates the gate triggering signal $GTS_1$ upon rising of the gate control pulse GCP, and the second differentiating circuit 31 generates the gate triggering signal $GTS_2$ upon the falling of the gate control pulse GCP. These two gate triggering signals $GTS_1$ and $GTS_2$ are shown in FIGS. 4(d) and 4(e), respectively. In FIGS. 4(f) and 4(g) there are shown waveforms of the chopper circuit $i_{CH}$ and motor current $i_M$ which flows through the electric motor 10.

As apparent from FIG. 4(f), the chopper current $i_{CH}$ is always distinguished with the delay time of the commutating period $T_2$ after the gate triggering signal $GTS_2$ is applied to the gate of the auxiliary thyristor 16. The commutating period $T_2$ during which the commutating operation is performed, is necessary in order to distinguish the chopper current $i_{CH}$. In the chopper control circuit mentioned above, the gate triggering signals $GTS_1$ and $GTS_2$ are prohibited during the time when there is no gate control pulse GCP because they are produced on the basis of the rising and the falling of the gate control pulse GCP. This is shown in FIGS. 4(c), 4(d), and 4(e), and will be called a "thining control" hereafter. This thining control, being applied to the chopper circuit 14, provides an advantage with respect to the duty factor Γ. That is, the duty factor Γ, comparing to the conventional ones, comes to be controllable over a relatively wide range from zero to maximum. This is because, by the prohibition of the gate triggering signals $GTS_1$ and $GTS_2$, the repetition period T of the equation (2) is lengthened against the conductive period $T_1$ thereof. The thining control mentioned above is very effective when it is applied to motor control such as needed by a forklift that is often required to operate at very slow speed.

Figure 5:
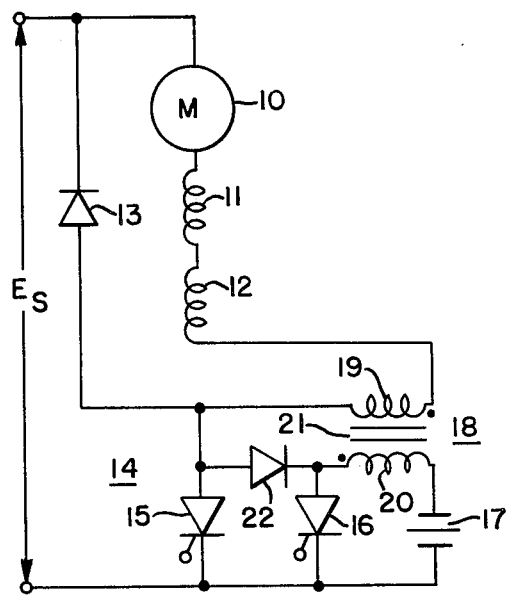
FIGS. 5, 6, and 7 show variations of the chopper circuit shown in FIG. 1.
Figure 6:
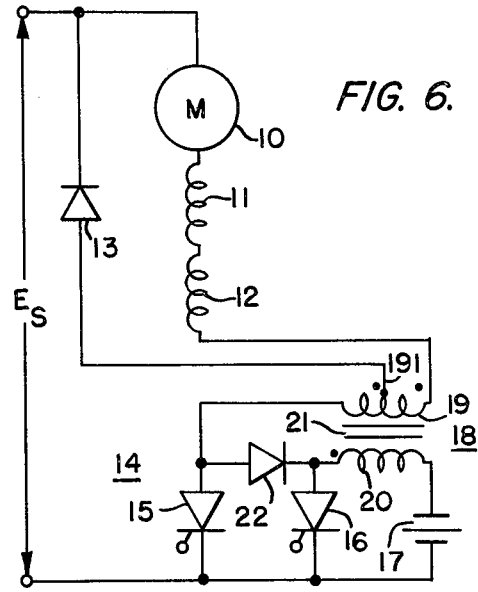
Figure 7:
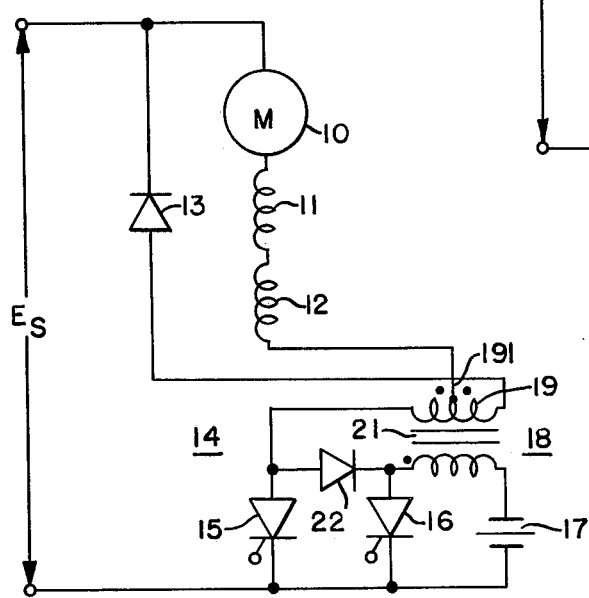

FIGS. 5, 6, and 7 show variations of the chopper circuit shown in FIG. 1, and eliminate the following drawback thereof. That is, if the current-magnetic flux $(i-\Phi)$ characteristic of the saturable core 21 of the saturable current transformer 18 is rather poor in the chopper circuit shown in FIG. 1, the magnetic flux $\Phi$ of such saturable core 21 will not reach the positive saturable value $\Phi_P$ just before the turn-on of the main thyristor 15. When the main thyristor 15 turns on, the magnetic flux $\Phi$ is turned to the positive saturable value $\Phi_P$ by current flowing therethrough. Because of this, a voltage almost equal to the source voltage $E_S$ is applied across the primary winding 19 of the saturable current transformer 18, and the voltage $(N_2/N_1) \cdot E_S$ is induced across the secondary winding 20. Therefore, the amount of the charged voltage $V_{CO}$ across the capacitor 17 and the voltage $(N_2/N_1) \cdot E_S$ is disadvantageously applied to the auxiliary thyristor 16 and the forward diode 22.

In the chopper circuit shown in FIG. 5, the primary winding 19 of the saturable current transformer 18 is provided within the circuit through which the motor current $i_M$ always flows, for example, the closed circuit formed with the electric motor 10, the field winding 11, the smoothing reactor 12 and the freewheel diode 13. Thus, the primary winding 19 is connected between the lower end of the smoothing reactor 12 and the anode of the freewheel diode 13, which electrode is also connected to the anode of the main thyristor 15. In such a chopper circuit, the magnetic flux $\Phi$ of the saturable core 21 of the saturable current transformer 18 is turned to the positive saturable value $\Phi_P$ sufficiently before the turn-on of the main thyristor 15 because the motor current $i_M$ always flows through the primary winding 19. However, the above-mentioned chopper circuit has the disadvantage that the primary winding 19 does not contribute to the inductance overcharging of the capacitor 17 as mentioned above but, this disadvantage can be overcome by lengthening the wiring of the chopper circuit.

In the chopper circuit shown in FIG. 6, the primary winding 19 has an intermediate tap 191, and the tap 191 thereof is connected to the anode of the freewheel diode 13. A part of the secondary winding 19 divided by the intermediate tap 191 forms a closed circuit together with the electric motor 10, the field winding 11, the smoothing reactor 12 and the freewheel diode 13, and the other part thereof a series connection with the chopper circuit 14.

In FIG. 7 the intermediate tap 191 of the primary winding 19 is connected to the lower end of the smoothing reactor 12, and one end of the primary winding 19 is connected to the anode of the diode 13, the other end thereof being connected to the anode of the main thyristor 15. Therefore, the chopper current $i_{CH}$ flows through one part of the primary winding 13 and the motor current $i_M$ through the other part thereof.

Therefore, these variations shown in FIGS. 6 and 7 have the advantage that the primary winding 19 of the saturable current transformer 18 can be used as the inductance for overcharging the capacitor 17, and that the above-mentioned disadvantageous voltage, that is, the amount of the voltages $V_{CO}$ and $(N_2/N_1) \cdot E_S$ applied to the auxiliary thyristor 16 and the forward diode 22 when the main thyristor 15 is turned on, can be avoided. Thus, the saturable ironcore 21 of the saturable current transformer 18 is always saturated at the positive saturable value $\Phi_P$ before the turn-on of the main thyristor 15 by the motor current $i_M$ which flows through at least a part of the primary winding 19.

While we have shown and described several embodiments in accordance with the present invention, it is understood that the same is not limited thereto but is susceptible of numerous changes and modifications as are obvious to those of ordinary skill in the art, and we therefore do not wish to be limited to the details described and shown herein but intend to cover all such changes and modifications as are obvious to those of skill in the art.

What is claimed is:

1. A motor control apparatus to control the supply of current from a source to an electric motor comprising:
    a chopper circuit through which current is supplied to said electric motor from said source, including a main thyristor, a series connection of an auxiliary thyristor and a diode, which series connection is connected in parallel to said main thyristor, and a capacitor connected in parallel to said auxiliary thyristor;
    signal means for generating a current instruction signal;
    control means connected to said signal means and said chopper circuit for controlling the duty factor of said chopper circuit depending on said current instruction signal; and
    a saturable transformer having a primary winding connected to carry at least a part of the current flowing through said electric motor, and a secondary winding connected within the closed circuit formed when the auxiliary thyristor of said chopper circuit is turned on, whereby discharging current and resonant current flow through said secondary winding and are dependent on current supplied to the electric motor.

2. A motor control apparatus as claimed in claim 1 wherein said primary winding is connected so that the current flowing through at least a part of the primary winding of said saturable current transformer is chopper current which is supplied to the electric motor through said chopper circuit.

3. A motor control apparatus as claimed in claim 1 wherein a freewheel diode is connected in parallel to the electric motor, and wherein through at least a part of said primary winding of saturable current transformer motor current flows which continues to flow through said freewheel diode during the time said chopper circuit is blocked.

4. A motor control apparatus as claimed in claim 1 wherein said control means includes:
    means for detecting the instantaneous amplitude of the current supplied to the electric motor and for generating an output;
    means for comparing the output of said current amplitude detecting means to said current instruction signal and for generating a comparison signal;
    means for applying gate triggering signals to the gates of the main and auxiliary thyristors of said chopper circuit in accordance with the comparison signal from said comparing means; and means for prohibiting the gate triggering signals from being applied to the gates of said main and auxiliary thyristors when the comparison signal is less than a predetermined value.

5. A motor control apparatus to control the supply of current from a source to an electric motor comprising:

a chopper circuit connected to said source in series with the electric motor and including a main thyristor, a series connection of an auxiliary thyristor and a diode, which series connection is connected in parallel to said main thyristor, and a capacitor connected in parallel to said auxiliary thyristor;

signal means for generating a current instruction signal;

control means connected to said signal means and said chopper circuit for controlling the duty factor of said chopper circuit depending on said current instruction signal; and a saturable current transformer having a primary winding connected in series to said chopper circuit and a secondary winding connected in series to the capacitor of said chopper circuit, whereby discharging current and resonant current flow through said secondary winding and current flowing through the auxiliary thyristor is dependent on current supplied to the electric motor through said chopper circuit.

6. A motor control apparatus to control the supply of current from a source to an electric motor comprising:

a chopper circuit connected to said source in series with the electric motor and including a main thyristor, a series connection of an auxiliary thyristor and a diode, which series connection is connected in parallel to said auxiliary thyristor;

a freewheel diode connected in parallel to the electric motor, whereby motor current continues to flow therethrough even if said chopper circuit is blocked;

signal means for generating a current instruction signal; means connected to said signal means and said chopper circuit for controlling the duty factor of said chopper circuit depending on said current instruction signal; and a saturable current transformer having a primary winding connected to the electric motor and a secondary winding connected in series to the capacitor of said chopper circuit, whereby discharging current and resonant current flow through said secondary winding and current flowing through the auxiliary thyristor is dependent on the motor current.

7. A motor control apparatus as defined in claim 6 wherein said primary winding is connected in series between said electric motor and said chopper circuit and has an intermediate tap connected to said freewheel diode.

8. A motor control apparatus as defined in claim 6 wherein said primary winding has an intermediate tap connected to said electric motor, one end thereof being connected to said freewheel diode and the other end thereof being connected to said chopper circuit.

9. A motor control apparatus of one of claims 6, 7, or 8 wherein said control means includes:

means for detecting the instantaneous amplitude of said current supplied to the electric motor and for generating an output;

means for comparing the output of said current amplitude detecting means to said current instruction signal and for generating a comparison signal;

means for applying gate triggering signal to the gates of the main and auxiliary thyristors of said chopper circuit in accordance with the comparison signal from said comparing means; and means for prohibiting the gate triggering signals from being applied to the gates of said main and auxiliary thyristors when the comparison signal is less than a predetermined value.

* * * * *